(12) United States Patent
Smith et al.

(10) Patent No.: US 9,216,710 B2
(45) Date of Patent: Dec. 22, 2015

(54) AIRBAG INFLATOR MOUNTING APPARATUS, METHODS, AND SYSTEMS

(71) Applicant: Autoliv ASP, Inc., Ogden, UT (US)

(72) Inventors: Bradley W. Smith, Plain City, UT (US); Michael P. Jordan, South Weber, UT (US); Jeffrey D. Williams, Roy, UT (US); Mark Sherman Hatfield, Providence, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/260,157

(22) Filed: Apr. 23, 2014

(65) Prior Publication Data

US 2015/0307050 A1    Oct. 29, 2015

(51) Int. Cl.
*B60R 21/217*    (2011.01)

(52) U.S. Cl.
CPC ................... *B60R 21/217* (2013.01)

(58) Field of Classification Search
CPC ..................................... B60R 21/217
USPC ..................................... 280/728.2
See application file for complete search history.

(56) References Cited

U.S. PATENT DOCUMENTS

| | | | |
|---|---|---|---|
| 3,772,062 A | 11/1973 | Shur et al. | |
| 3,843,010 A | 10/1974 | Morse et al. | |
| 3,874,544 A | 4/1975 | Harmon | |
| 3,969,812 A | 7/1976 | Beck | |
| 4,640,312 A | 2/1987 | Patell et al. | |
| 4,835,975 A | 6/1989 | Windecker | |
| 4,865,210 A | 9/1989 | Brainard, II | |
| 4,877,264 A | 10/1989 | Cuevas | |
| 4,913,461 A | 4/1990 | Cuevas | |
| 4,982,870 A | 1/1991 | Van Loon | |
| 5,028,070 A | 7/1991 | Bender | |
| 5,062,367 A | 11/1991 | Hayashi et al. | |
| 5,100,171 A | 3/1992 | Faigle et al. | |
| 5,264,059 A | 11/1993 | Jacaruso et al. | |
| 5,340,148 A | 8/1994 | Faigle et al. | |
| 5,423,568 A | 6/1995 | Zushi et al. | |
| 5,427,406 A * | 6/1995 | Zushi et al. | ................. 280/728.2 |

(Continued)

FOREIGN PATENT DOCUMENTS

| | | |
|---|---|---|
| DE | 20308650 | 10/2003 |
| DE | 102009006077 | 7/2010 |

OTHER PUBLICATIONS

Concise Explanation of Relevance of DE102009006077.

(Continued)

*Primary Examiner* — Paul N Dickson
*Assistant Examiner* — Darlene P Condra
(74) *Attorney, Agent, or Firm* — Phillips Ryther & Winchester; Matthew D. Thayne

(57) ABSTRACT

Methods, apparatus, and systems for coupling an airbag inflator with a housing, such as an airbag module housing or an adapter housing configured to be coupled with an airbag module housing. In some implementations, a housing comprising an opening may be provided. An inflator comprising a collar may be positioned in the housing such that the collar of the inflator extends into, or in some cases through, the opening of the housing. The inflator may be fixedly coupled with the housing by engaging an exterior surface of the inflator collar with at least one engagement structure, such as a retainer clip or crimp formed in a collar sleeve of the housing.

29 Claims, 17 Drawing Sheets

(56) References Cited

U.S. PATENT DOCUMENTS

| | | | |
|---|---|---|---|
| 5,492,364 A | 2/1996 | Anderson et al. | |
| 5,547,213 A | 8/1996 | Lang et al. | |
| 5,613,700 A | 3/1997 | Hiramitsu et al. | |
| 5,615,907 A * | 4/1997 | Stanger | 280/728.2 |
| 5,671,946 A | 9/1997 | Whalen et al. | |
| 5,743,558 A * | 4/1998 | Seymour | 280/739 |
| 5,788,274 A * | 8/1998 | Gunn | 280/736 |
| 5,791,682 A * | 8/1998 | Hiramitsu et al. | 280/728.2 |
| 5,931,491 A * | 8/1999 | Bosgeiter et al. | 280/728.2 |
| 6,145,872 A | 11/2000 | Soderquist et al. | |
| 6,149,184 A * | 11/2000 | Ennis et al. | 280/728.2 |
| 6,328,332 B1 | 12/2001 | Schutz | |
| RE38,494 E | 4/2004 | Kirker et al. | |
| 7,063,348 B2 * | 6/2006 | Webber et al. | 280/728.2 |
| 7,147,124 B2 | 12/2006 | Minta et al. | |
| 7,175,894 B2 | 2/2007 | Nakamura | |
| 7,384,064 B2 * | 6/2008 | Thomas et al. | 280/731 |
| 7,438,315 B2 * | 10/2008 | Blackburn | 280/741 |
| 7,516,983 B2 | 4/2009 | Suehiro et al. | |
| 7,597,353 B2 | 10/2009 | Smith et al. | |
| 7,905,516 B2 | 3/2011 | Bostick et al. | |
| 8,297,653 B2 | 10/2012 | Smith | |
| 2004/0235378 A1 | 11/2004 | Byma et al. | |
| 2005/0194768 A1 * | 9/2005 | Bonam et al. | 280/728.2 |
| 2005/0225064 A1 | 10/2005 | Suehiro et al. | |
| 2006/0060325 A1 | 3/2006 | Gordon et al. | |
| 2006/0267322 A1 | 11/2006 | Eckelberg | |
| 2007/0125488 A1 | 6/2007 | Bisson et al. | |
| 2007/0132218 A1 * | 6/2007 | Kim et al. | 280/731 |
| 2012/0112438 A1 * | 5/2012 | Soderquist et al. | 280/728.2 |
| 2012/0234839 A1 | 9/2012 | Smith et al. | |
| 2012/0235392 A1 | 9/2012 | Smith | |
| 2013/0200600 A1 * | 8/2013 | Bierwirth et al. | 280/740 |
| 2014/0144343 A1 | 5/2014 | Smith et al. | |

OTHER PUBLICATIONS

Concise Explanation of Relevance of DE20308650.
International Search Report for PCT/US15/026909, Jul. 15, 2015, 2 pgs.
Written Opinion for PCT/US15/026909, Jul. 15, 2015, 7 pgs.

* cited by examiner

AIRBAG INFLATOR MOUNTING APPARATUS, METHODS, AND SYSTEMS

SUMMARY

Methods, apparatus, and systems are disclosed herein that relate to coupling an airbag inflator with a housing, such as an airbag module housing or an adapter housing configured to be coupled with an airbag module housing and/or another component of a vehicle airbag system. Some embodiments may be particularly suited to coupling an inflator comprising a composite fiber overwrap with such a housing.

In one more particular example of a vehicle airbag assembly according to certain embodiments, the assembly may comprise a housing comprising an opening, and an inflator comprising a collar configured to be received in the opening. The collar may be configured to extend at least partially through the opening such that at least a portion of the collar extends out of the opening. The assembly may further comprise one or more retainer clips configured to engage the collar to prevent the inflator/inflator collar from being withdrawn from the opening after the collar has been positioned such that at least a portion of the collar extends out of the opening.

In some embodiments, an initiator of the inflator may be at least partially housed within the collar. Some such embodiments may therefore comprise a rigid, strong material, such as steel, carbon winding, aluminum, zinc alloy, Zamak, or another metal, metal alloy, and/or metal composite material.

In some embodiments, the retainer clip may comprise at least two legs. The collar may comprise at least one slot configured to receive at least a portion of at least one of the legs. In some such embodiments, the collar may comprise two opposing slots configured to receive two opposing legs of the retainer clip to prevent the collar from being withdrawn from the opening. The retainer clip(s) may be configured to resiliently bias the collar with respect to the housing to prevent the collar from being withdrawn from the opening. In order to accomplish such resilient biasing, the retainer clip may comprise an offset portion configured to contact a portion of the housing adjacent to the opening when the retainer clip is engaged with the collar such that at least a portion of the retainer clip adjacent to the offset portion is spaced apart from a portion of the housing adjacent to the opening when the retainer clip is engaged with the collar.

In some embodiments, the collar may comprise a projection, and the opening of the housing may comprise a notch configured to receive the projection to align the collar within the opening in a preconfigured rotational position.

In another example of a vehicle airbag assembly according to certain embodiments, the assembly may comprise a housing comprising an opening at least partially defined by a collar sleeve, and an inflator comprising an inflator collar configured to be received in the opening and to extend into the collar sleeve. The inflator collar may comprise at least one crimping feature, such as a crimp groove, configured to facilitate fixed engagement between the inflator collar and the collar sleeve. The crimp groove may be configured to engage a crimp formed in the collar sleeve.

In some embodiments, the collar sleeve may further comprise one or more poka yoke features, such as a flattened portion, protrusion, recession, or the like. In some such embodiments, the inflator collar may comprise a corresponding poka yoke feature configured to facilitate engagement of the inflator collar within the collar sleeve in a preconfigured rotational position. Preferably, the two poka yoke features have complementary shapes to facilitate such engagement.

In some embodiments, the housing may be configured such that, upon engagement of the inflator with the housing, one or more air gaps are formed between the inflator and the housing. For example, in some embodiments, the housing may comprise a plurality of ribs formed within an inner surface of the housing configured to contact the inflator such that a plurality of air gaps are formed between the inflator and the housing in between the ribs.

In some preferred embodiments, the inflator may be configured to be coupled with the housing without requiring rotation of the inflator and/or inflator collar with respect to the housing.

In an example of a method for assembling a vehicle airbag assembly according to some implementations, a housing may be provided comprising an opening. In some implementations, the housing may comprise an airbag module housing. Alternatively, the housing may comprise an adapter housing configured to facilitate coupling of a flangeless inflator to an airbag module housing.

An inflator comprising a collar may be provided. The collar may be positioned into the opening of the housing such that at least a portion of the exterior surface of the collar is adjacent to a portion of the housing defining the opening. The inflator may then be coupled to the housing by engaging an exterior surface of the collar with at least one engagement structure, such as a retainer clip or a crimp formed in a collar sleeve of the housing. In implementations in which the engagement structure comprises a retainer clip, the step of coupling the inflator with the housing may comprise engaging the retainer clip with the collar to prevent the collar from being withdrawn from the opening in the housing. In some preferred implementations, the inflator may then be coupled to the housing without rotating the inflator and/or inflator collar with respect to the housing.

In some implementations, the collar may comprise at least one collar engagement structure, such as a crimp groove. In some such implementations, the step of coupling the inflator with the housing may comprise engaging the at least one collar engagement structure with the at least one engagement structure. In some implementations, the opening of the housing may be at least partially defined by a collar sleeve configured to receive the collar of the inflator. In some such implementations, the step of coupling the inflator with the housing may comprise forming a crimp in the collar sleeve to engage the collar.

The features, structures, steps, or characteristics disclosed herein in connection with one embodiment may be combined in any suitable manner in one or more alternative embodiments and/or implementations.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems, apparatus, and methods disclosed herein relate to coupling an airbag inflator with an airbag module housing, an adapter configured to be coupled with an airbag module housing, and/or another component of a vehicle airbag system. In some embodiments, various techniques and/or structures are disclosed that may be used to facilitate coupling an inflator comprising a hub or collar with an airbag module housing, an adapter configured to be coupled with an airbag module housing, and/or another component of a vehicle airbag system. In some preferred embodiments, the inflator may comprise an inflator comprising a composite fiber overwrap. Such inflators are disclosed, for example, in U.S. Pat. No. 8,297,653 titled "Pyrotechnic Inflator with Composite Overwrap," the entire contents of which are hereby incorporated by reference herein. However, it should be understood that the concepts disclosed herein may be applicable to a wide variety of other inflators, such as other flangeless inflators and/or other inflators lacking certain mounting features and/or components.

Figure 1:
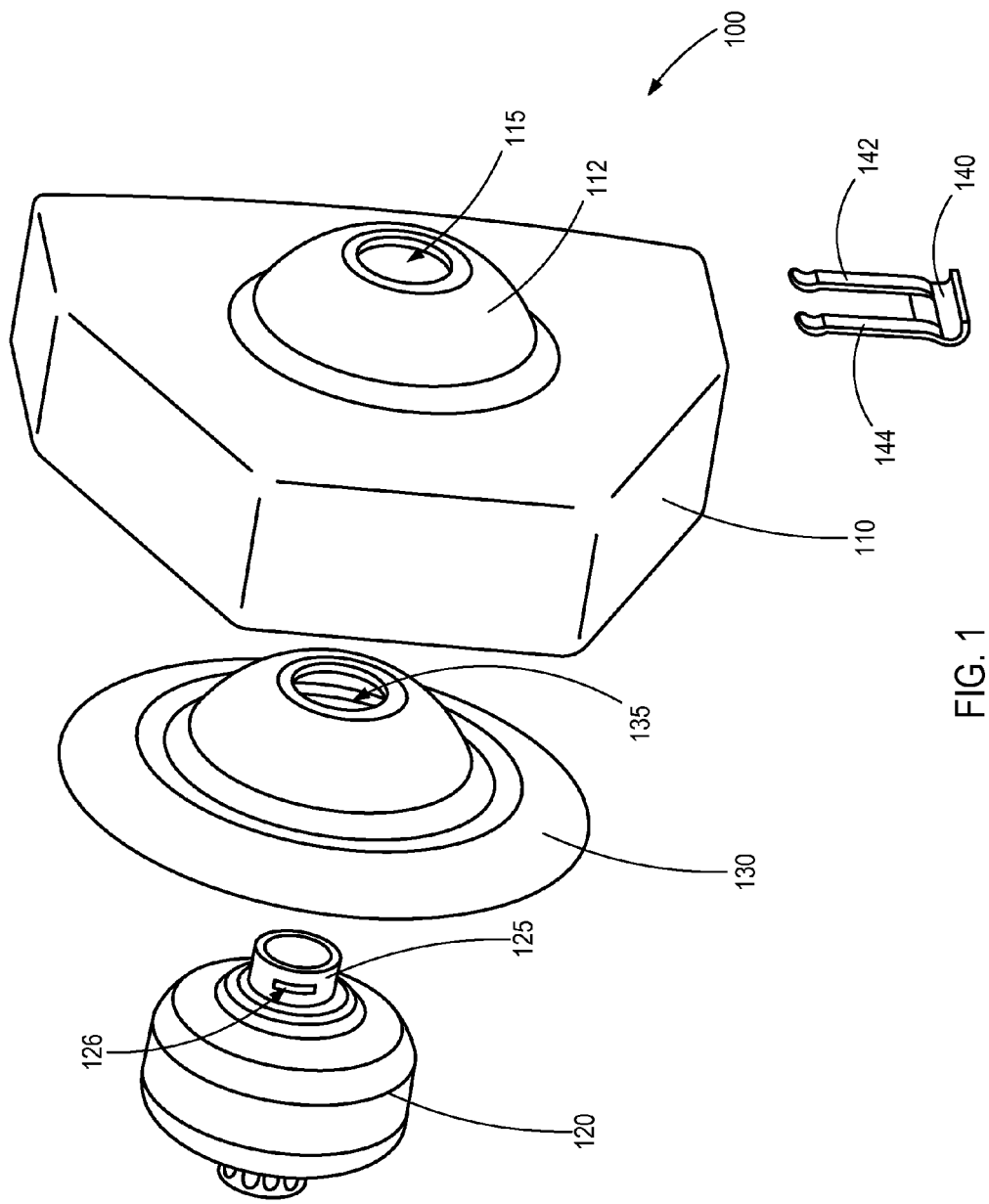
FIG. 1 depicts an exploded view of an airbag assembly for a vehicle according to one embodiment.

Additional details of certain embodiments and implementations will now be discussed in greater detail in connection with the accompanying figures. FIG. 1 depicts an embodiment of a vehicle airbag assembly 100. Vehicle airbag assembly 100 comprises a housing 110 comprising an opening 115. Housing 110 comprises an airbag module housing 110. However, other embodiments are contemplated in which the housing may instead comprise an adapter configured for coupling to an airbag module housing, as discussed in greater detail below.

Opening 115 is positioned on a recess 112 of housing 110. Recess 112 comprises a hemispherical shape that, as depicted in FIG. 1, at least substantially matches a shape of an inflator 120 that may also be part of airbag assembly 100. Recess 112, as also depicted in FIG. 1, protrudes from an exterior surface of housing 110. Of course, a wide variety of alternative embodiments are contemplated. For example, some embodiments may comprise a recess comprising a different shape, some embodiments may comprise a recess that does not protrude from an exterior surface of the housing, and some embodiments may lack such a recess entirely.

Inflator 120 comprises a collar 125 configured to be received in the opening 115. More particularly, collar 125 is configured to extend at least partially through the opening 115 such that at least a portion of the collar 125 extends out of opening 115 when airbag assembly 100 is fully assembled. In some embodiments, collar 125 may comprise a metal collar. In some embodiments, collar 125 may be configured to at least partially house an initiator within the collar 125. In some such embodiments, collar 125 may fully house an initiator therein.

Vehicle airbag assembly 100 further comprises an airbag cushion 130, which may be positioned within housing 110. Inflator 120 may be positioned within airbag cushion 130. As shown in FIG. 1, airbag cushion 130 may comprise an opening 135 that may be aligned with opening 115 in housing 110 such that collar 125 may extend through both opening 115 and opening 135 in an assembled configuration.

Vehicle airbag assembly 100 further comprises a retainer clip 140. Retainer clip 140 may be configured to engage collar 125 to prevent collar 125 from being withdrawn from opening 115 after collar 125 has been positioned such that at least a portion of the collar 125 extends out of opening 115. Retainer clip 140 may be coupled to collar 125 by way of one or more slots 126 formed within an exterior surface of collar 125. In some embodiments, collar 125 may comprise two opposing slots configured to receive two opposing legs, such as legs 142 and 144 of retainer clip 140, to prevent collar 125 from being withdrawn from opening 115. At least a portion of one or more of the retainer clip legs may be configured to engage a portion of the housing, such as housing 110, adjacent to the opening, such as opening 115, through which the collar, such as collar 125, extends.

Figure 2:
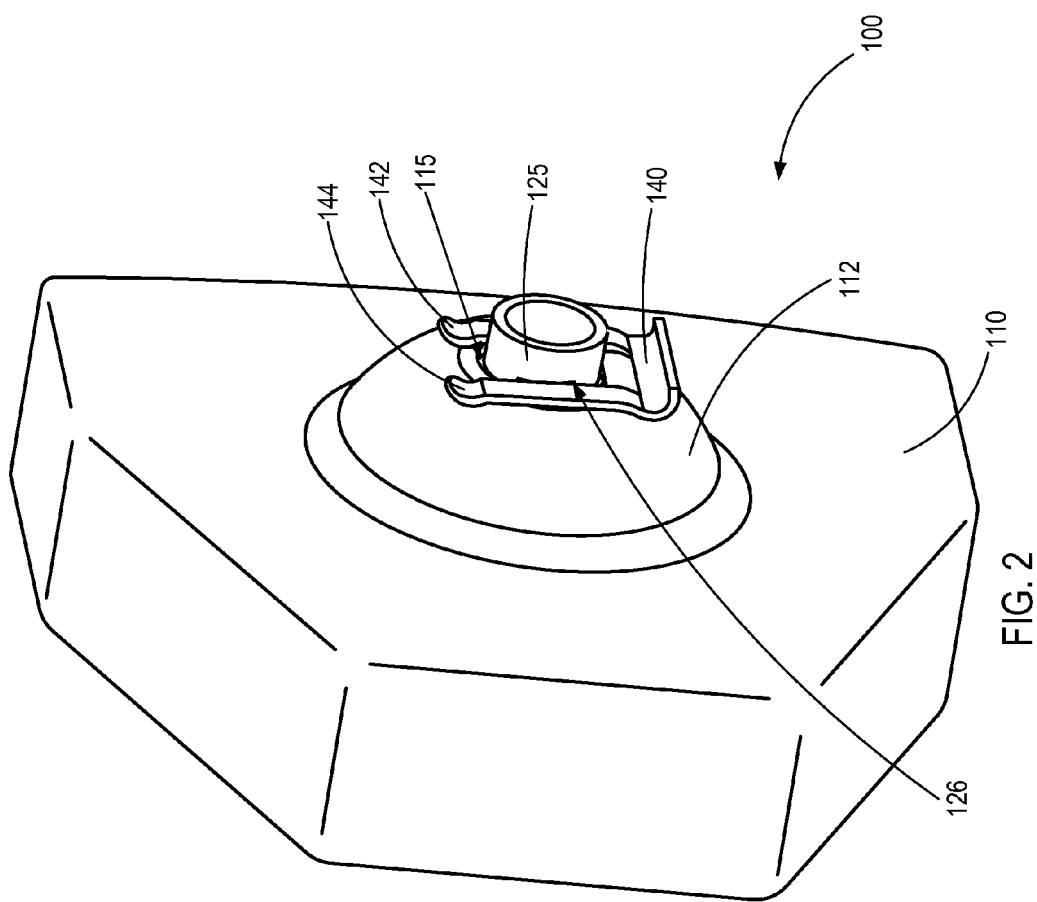
FIG. 2 depicts the airbag assembly of FIG. 1 in a fully-assembled configuration.

FIG. 2 depicts airbag assembly 100 in a fully-assembled configuration. More particularly, inflator collar 125 has been extended through opening 115 and legs 142 and 144 of retainer clip 140 have been engaged with opposing slots 126 (only one slot is visible in the figure) of collar 125.

Figure 3:
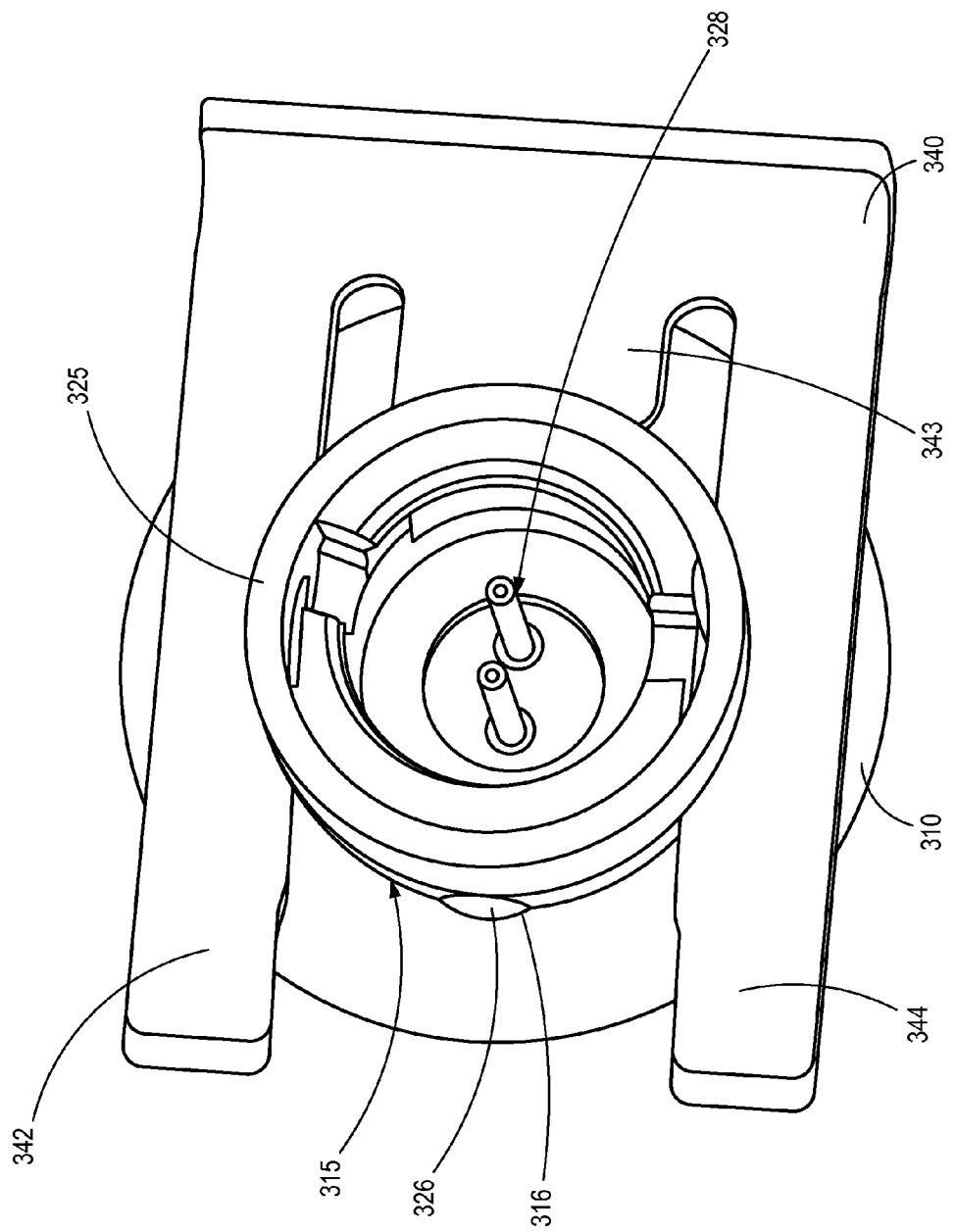
FIG. 3 depicts a plan view of the interface between an inflator collar and a housing for an airbag assembly according to one embodiment.

FIG. 3 depicts an interface between an inflator collar 325, a retainer clip 340, and a housing 310 according to another embodiment of a vehicle airbag assembly. As shown in this figure, retainer clip 340 comprises three legs, namely, legs 342, 343, and 344. Legs 342 and 344 extend along opposite ends of retainer clip 340 and leg 343 is positioned therebetween. It can also be seen in FIG. 3 that leg 343 is shorter and wider than legs 342 and 344. Leg 343 may be configured to be at least partially received in a third slot in collar 325 (not directly visible in the figure). The dimensions of the various portions of retainer clip 340 may vary as desired in accordance with particular applications.

The collar 325 of the embodiment depicted in FIG. 3 also comprises a projection 326. Projection 326 may be configured to be received within a corresponding notch 316 formed within opening 315. Notch 316 may be configured to receive projection 326 in order to align collar 325 within opening 315 in a preconfigured rotational configuration. In some embodiments, the notch may instead be formed within the collar and the projection may be formed in the opening in the housing that receives the collar. In some embodiments, a plurality of such notch/projection combinations may be provided.

FIG. 3 also illustrates that collar 325 at least partially encloses an initiator 328 of an inflator. It may therefore be desirable to form collar 325 from a rigid, protective material, such as a metal or metal composite material.

Figure 4:
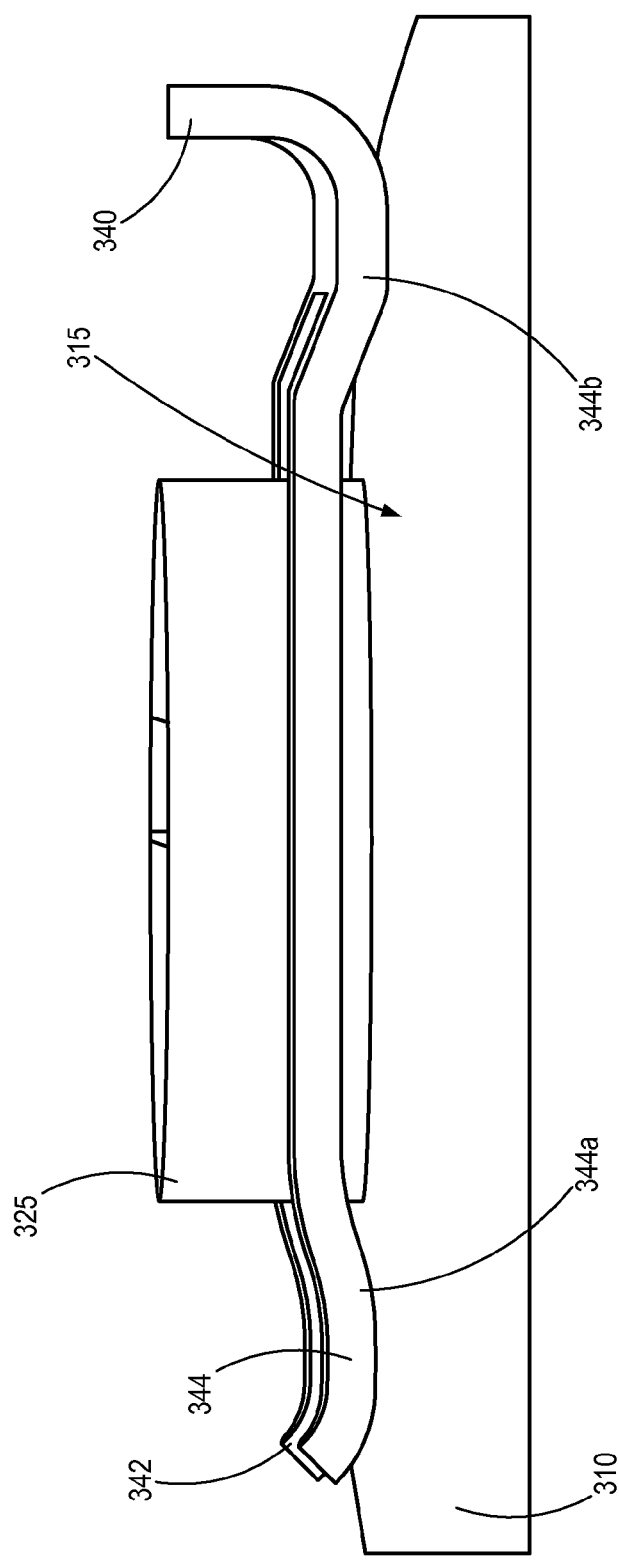
FIG. 4 is a side elevation view of the embodiment depicted in FIG. 3.

In some embodiments, the retainer clip(s) may be configured to resiliently bias an inflator collar with respect to a housing, such as an airbag module housing, to prevent the collar from being withdrawn from an opening in the housing. For example, as shown in FIG. 4, retainer clip 340 further comprises a first offset portion 344a and a second offset portion 344b, both of which are configured to contact a portion of the housing 310 adjacent to opening 315 when the retainer clip 340 is engaged with collar 325. In the depicted embodiment, a portion of retainer clip 340 in between the two offset portions 344a and 344b is spaced apart from a portion of the housing 310 adjacent to opening 315 when the retainer clip 340 is engaged with collar 325. This may allow for retainer clip 340 to act as a leaf spring or other resiliently biasing member by providing room for retainer clip 340 to flex while in contact with housing 310. Although not as clearly visible in FIG. 4, it is contemplated that some embodiments may similarly comprise offset portions on leg 342 as well.

Figure 5:
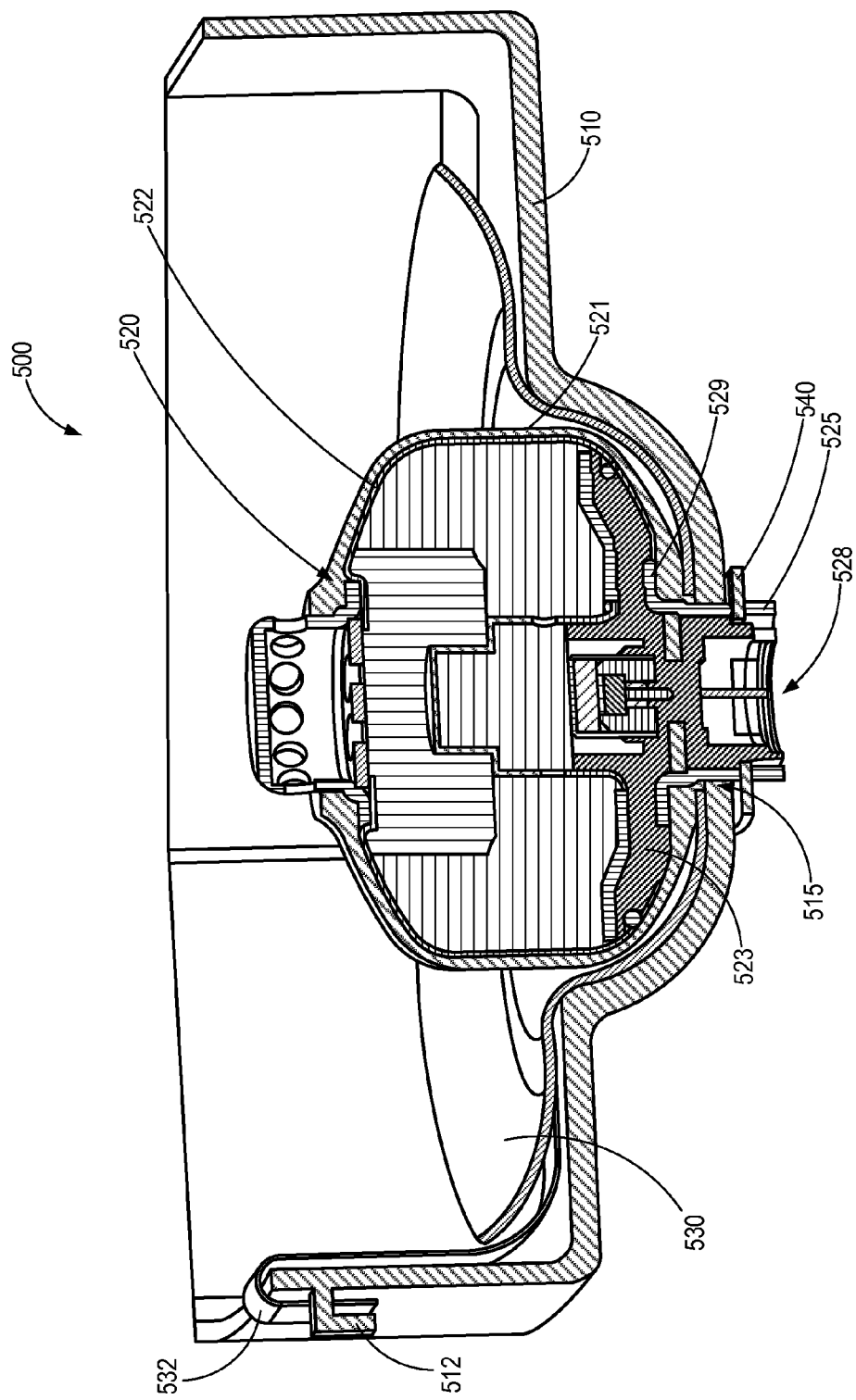
FIG. 5 is a cross-sectional view of an airbag assembly for a vehicle according to another embodiment.

FIG. 5 illustrates another embodiment of a vehicle airbag assembly 500. Airbag assembly 500 comprises a housing 510 comprising an opening 515. Housing 510 comprises an airbag module housing. However, in other embodiments, housing 510 may alternatively comprise an adapter configured for coupling inflator 520 to an airbag module housing.

Inflator 520 comprises a collar 525 that is received in the opening 515. More particularly, collar 525 extends through opening 515 such that at least a portion of collar 525 extends out of opening 515 in the assembled configuration depicted in FIG. 5. In some embodiments, collar 525 may comprise a metal material, such as steel. In the depicted embodiment, collar 525 comprises a sleeve 529 configured to facilitate coupling of collar 525 to inflator 520. Sleeve 529 may be engaged under the body, or another portion of, inflator 520. This may be useful for embodiments in which one or more portions of the inflator are made of another material, such as a thermoplastic material. By providing a separate collar that may be coupled with another part of inflator 520, such as a main body of inflator 520, the weight and/or cost of inflator 520, and therefore the weight and/or cost of the airbag assembly 500, may be reduced. In addition, plastic may not be strong enough to withstand airbag deployment loads for a configuration in which the cushion loads are anchored into the inflator collar. Thus, it may be desirable for certain embodiments to provide a steel or other stronger structural piece that is separately coupled to the inflator. However, other embodiments are contemplated in which collar 525 may be an integral part of inflator 520.

Vehicle airbag assembly 500 further comprises a hook 512 positioned on an exterior surface of housing 510. Hook 512 may be used to receive a flap 532 of airbag cushion 530, which may be useful to orient the airbag cushion 530 and/or other components of vehicle airbag assembly 500 in a desired position, such as a desired rotational configuration, with respect to other components of airbag assembly 500. In some embodiments, flap 532 may comprise a corresponding hook or other similar structure configured to engage hook 512.

It can also be seen in FIG. 5 that collar 525 at least partially encloses an initiator 528 of inflator 520. It may therefore be desirable to form collar 525 from a rigid, protective material, such as a metal or metal composite material.

Inflator 520 may further comprise an overwrap 521 formed about at least a portion of a subassembly of the inflator 520. Overwrap 521 may be provided in order to facilitate withstanding the high pressures generated within a combustion chamber of inflator 520 upon reaction of the pyrotechnic material contained therein. In some embodiments, overwrap 521 may comprise a composite of fibers comprising at least one of glass, basalt, and a resin matrix system.

Inflator 520 may further comprise a shell member 522 and an end cap 523. In some embodiments, the shell member 522 may comprise an open end, which may permit access to an interior of shell member 522, and a closed end positioned at least substantially opposite from the open end.

In some embodiments, shell member 522 may comprise a generally elliptical, truncated bulbous, or rounded disc form or shape. Those of ordinary skill in the art, however, will, using the teachings provided herein, appreciate that shell members of other forms or shapes can, if desired, be used. For example, some embodiments may comprise a spherical shell member. While spherical shell members can be advantageous from a structural design point of view, such shell members may, for certain applications, hinder installation and placement of an inflator assembly in a vehicle. Flat, closed end shell members may also be used for certain embodiments. However, such embodiments may not be sufficiently strong as may be desirable for certain applications. Thus, the use of an at least substantially elliptical-shaped shell member may be preferred for certain applications, as it may provide sufficient strength in structural design while also reducing the height of the resulting inflator assembly.

In some embodiments, shell member 522 may comprise a metal, such as drawn steel or aluminum, for example. Shell member 522 may comprise a thickness that is less than conventional pyrotechnic pressure vessel housings. For example, whereas conventional pyrotechnic pressure vessel metal housings are commonly 2 to 3 mm thick, by providing overwrap 521, metal shell members 522 having a thickness of less than 1 mm, and in some cases less than 0.5 mm, may be used. In alternative embodiments, shell member 522 may instead, or additionally, comprise a plastic material. In some embodiments, shell member 522 may be incapable of withstanding the pressure generated within the combustion chamber of inflator 520 upon reaction of the pyrotechnic material contained therein without the support provided by overwrap 521.

In some embodiments, the end cap 523 may comprise a molded plastic with at least a portion of initiator 528 integrally molded therein. For example, in some embodiments, a glass-filled nylon, such as 33% glass-filled nylon 6/12, may be used. One or more metal inserts may be included to improve the structural capability of the end cap 523 if desired. In other embodiments, end cap 523 may comprise a cast or machined metal, such as aluminum, with the initiator 528 crimped or molded in position therein.

In some embodiments, shell member 522 and end cap 523 may be joined together by crimping shell member 522 over end cap 523. In other embodiments, end cap 523 and/or shell member 522 may be formed of molded plastic. In some such embodiments, shell member 522 and end cap 523 may be snapped together. Similarly, in some embodiments, collar 525 may be coupled with end cap 523 by molding or otherwise inserting sleeve 529 into end cap 523. Alternatively, collar 525 may be engaged under a portion of inflator 520, such as by inserting sleeve 529 underneath shell member 522.

FIG. 5 also depicts retainer clip 540 positioned within collar 525 adjacent to opening 515 of housing 510. As mentioned above, retainer clip 540 may be configured such that, when positioned in a fully-assembled configuration, as shown in FIG. 5, retainer clip 540 may comprise one or more portions that are in contact with a portion of housing 510 around opening 515 and one or more portions that are spaced apart from housing 510. In this manner, retainer clip 540 may be allowed to flex and may resiliently bias collar 525, and thereby resiliently bias inflator 520, towards a seated position with respect to housing 510.

Figure 6:
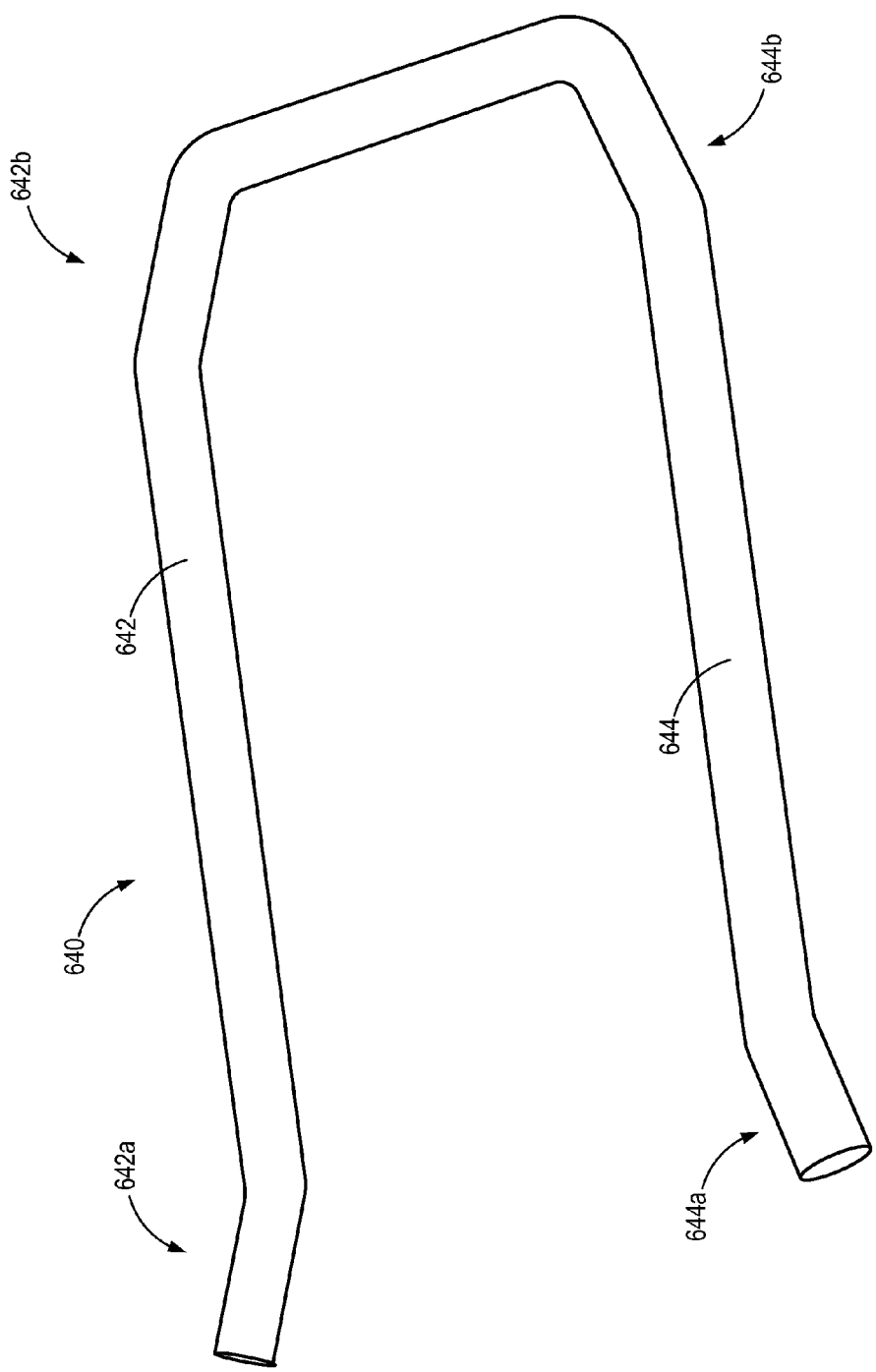
FIG. 6 is a perspective view of an alternative embodiment of a retainer clip for an inflator.
Figure 7:
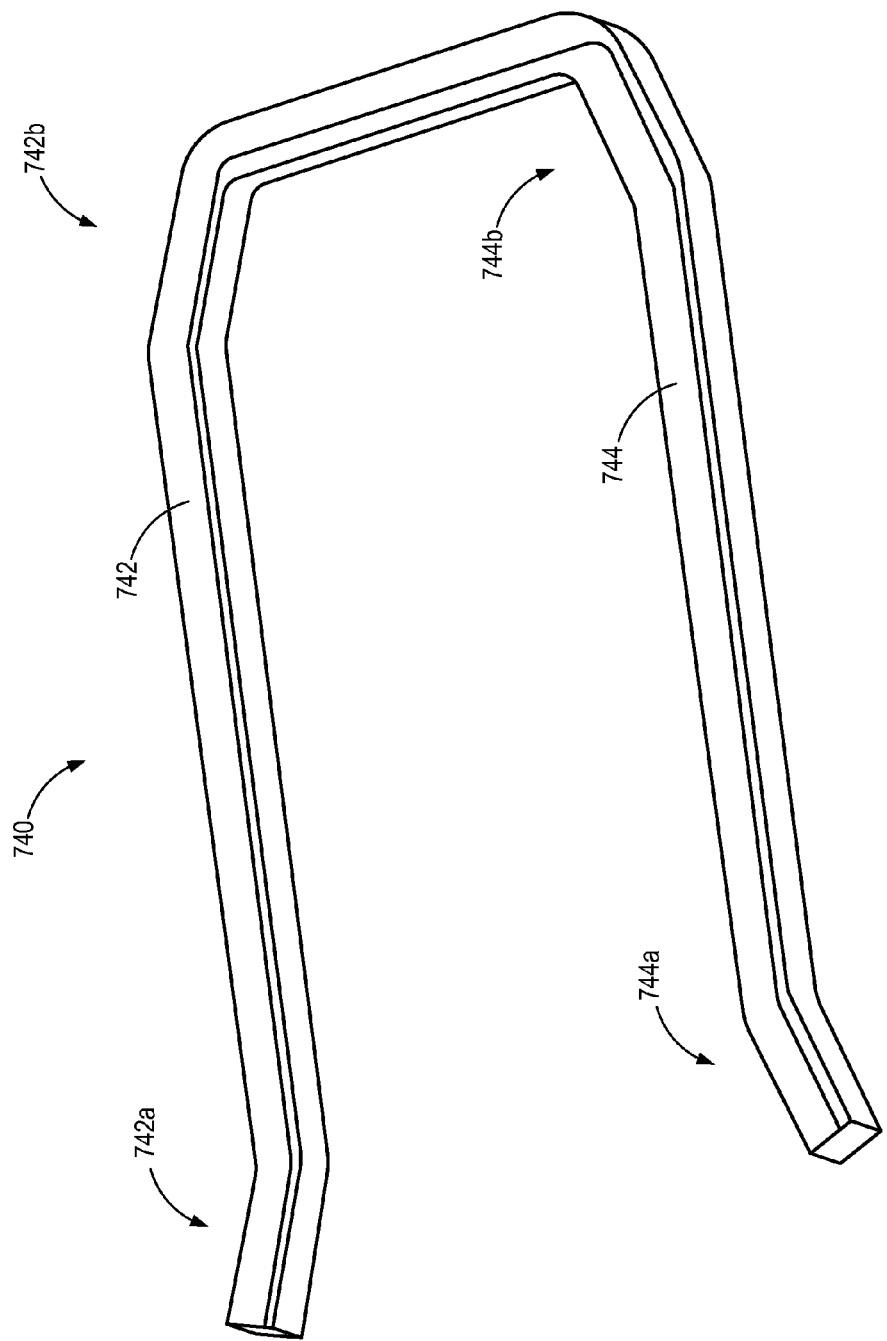
FIG. 7 is a perspective view of another alternative embodiment of a retainer clip for an inflator.

FIGS. 6 and 7 depict alternative embodiments of retainer clips, namely retainer clips 640 and 740, respectively. Both retainer clip 640 and retainer clip 740 comprise two legs. Thus, retainer clip 640 comprises legs 642 and 644, whereas retainer clip 740 comprises legs 742 and 744. Each leg of each retainer clip depicted in these figures further comprises two offset portions configured to allow the respective retainer clips to resiliently bias a collar of an inflator towards a housing. More particularly, leg 642 of retainer clip 640 comprises a first offset portion 642*a* and a second offset portion 642*b*. This allows for a portion of leg 642 in between offset portions 642*a* and 642*b* to be spaced apart from a portion of a housing adjacent to an inflator collar in a fully-assembled configuration. Similarly, leg 644 of retainer clip 640 comprises a first offset portion 644*a* and a second offset portion 644*b*. Legs 642 and 644 of retainer clip 640 comprise a circular cross-sectional shape.

Retainer clip 740, by contrast, comprises legs 742 and 744 that comprise a rectangular cross-sectional shape. This type of cross-sectional shape may be preferable for certain embodiments, such as, for example, embodiments comprising an inflator collar having a slot having one or more flat surfaces configured to engage a corresponding flat surface of a retainer clip leg. However, like retainer clip 640, legs 742 and 744 of retainer clip 740 both comprise two offset portions at opposite ends of these legs. More particularly, leg 742 comprises offset portions 742*a* and 742*b*, whereas leg 744 comprises offset portions 744*a* and 744*b*.

As depicted in FIG. 6 and FIG. 7, in some embodiments, offset portions 642*a*, 644*a*, 742*a*, and 744*a* may also, or alternatively, comprise widened portions such that the opening defined by the opposing legs widens at offset portions 642*a*, 644*a*, 742*a*, and 744*a*. In other embodiments, a retainer clip comprising a c-clip or another similar clip available to those of ordinary skill in the art may be used.

Figure 8:
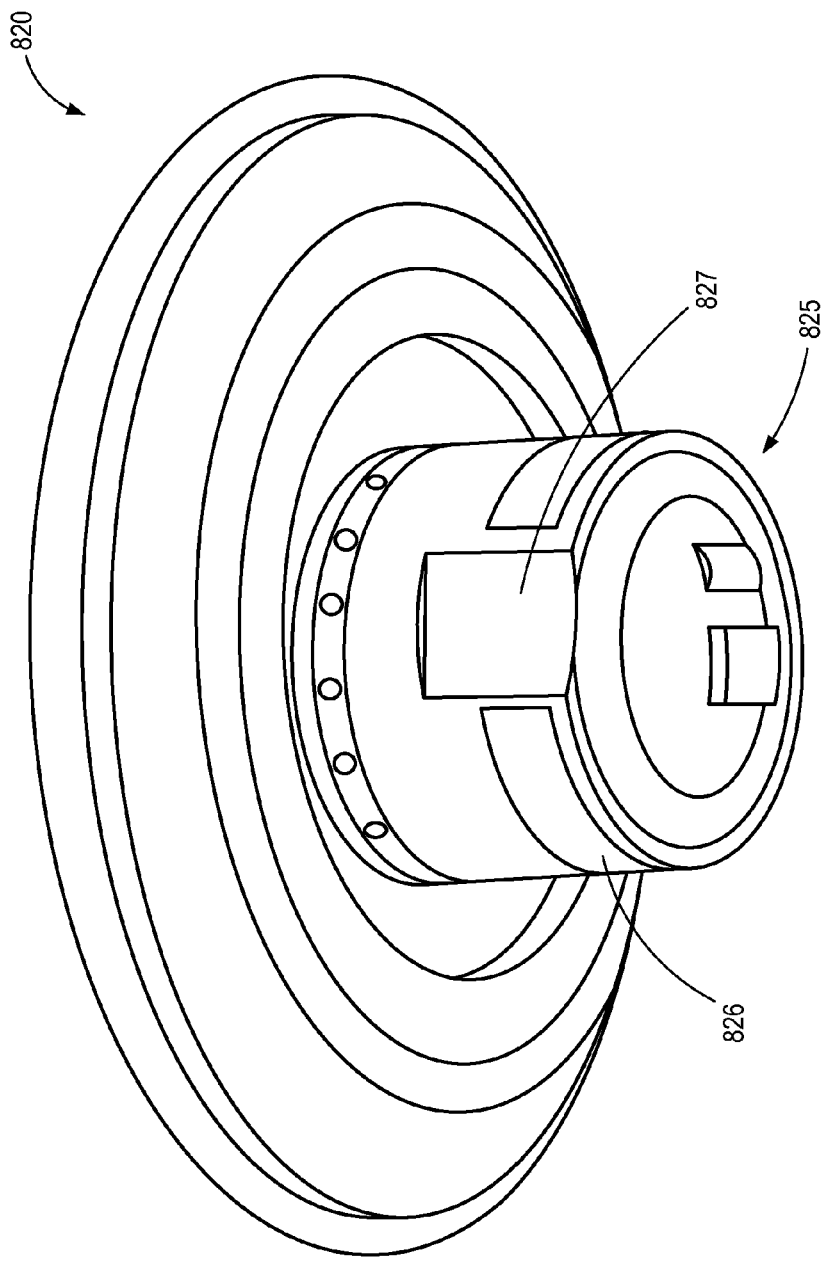
FIG. 8 is a perspective view of a bottom portion of an inflator comprising a collar according to yet another embodiment.

FIG. 8 is a perspective view depicting a lower portion of an alternative embodiment of an inflator 820 comprising an inflator collar 825. Inflator collar 825 is configured to be received in an opening of a housing—such as an airbag module housing or an adapter housing configured to facilitate coupling of a flangeless inflator to an airbag module housing. In some embodiments, collar 825 may be configured to extend into a collar sleeve of a housing, as discussed below. Collar 825 further comprises a crimping feature 826 configured to facilitate fixed engagement between the collar 825 and a collar sleeve of a housing. In the depicted embodiment, crimping feature 826 comprises a crimp groove 826. Crimp groove 826 may be configured to engage a crimp formed in a collar sleeve of a housing, as shown in, and described in greater detail with respect to, FIG. 9. Crimp groove 826 is an example of a crimping feature configured to engage a crimp formed in a collar sleeve of a housing.

Figure 9:
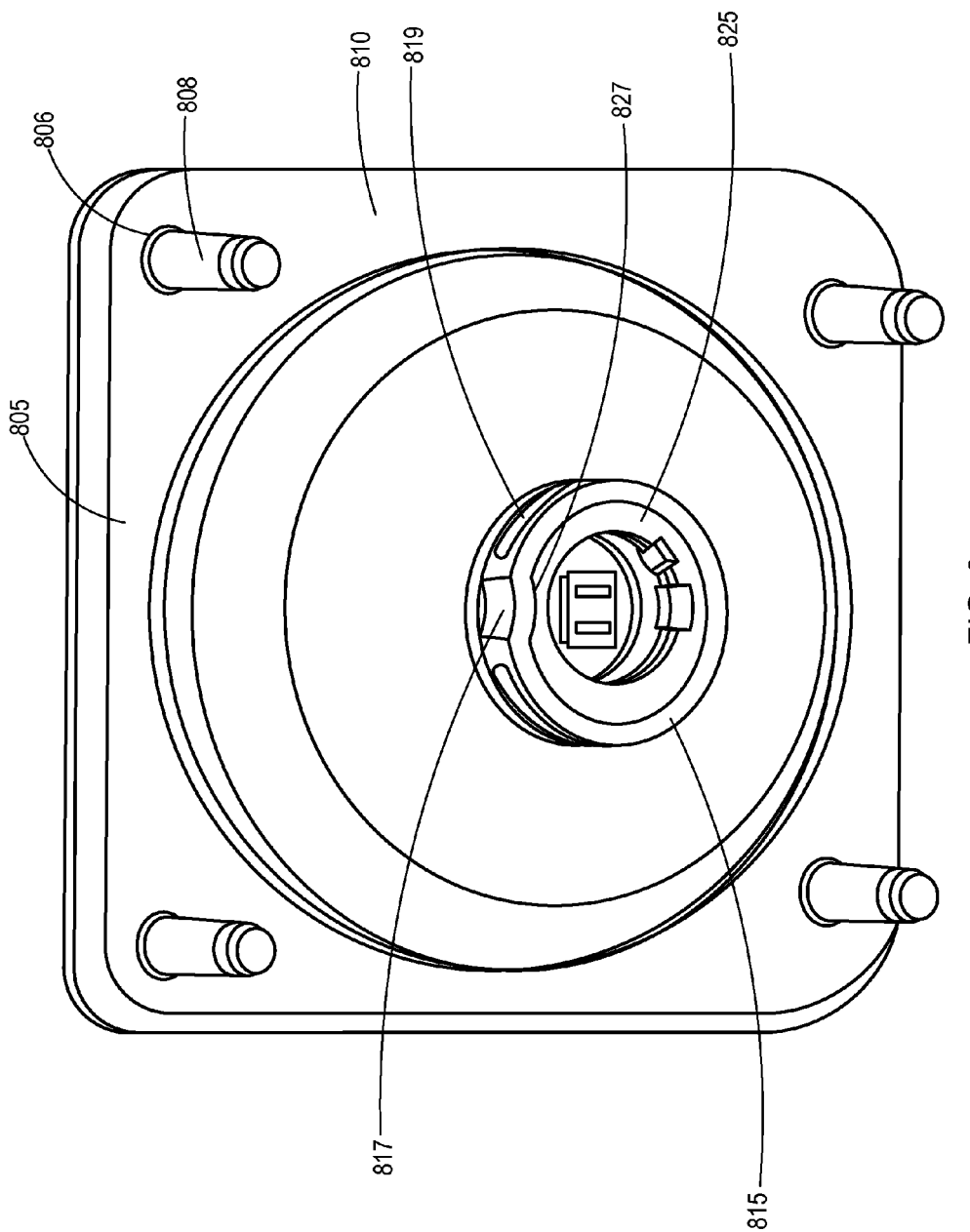
FIG. 9 depicts a bottom portion of the inflator of FIG. 8 positioned in an embodiment of an adapter housing configured to facilitate coupling of a flangeless inflator to an airbag module housing.

Collar 825 further comprises a poka yoke feature 827. Poka yoke feature 827 may be configured to engage a corresponding poka yoke feature formed in a collar sleeve of a housing. For example, as illustrated in FIG. 9, poka yoke feature 827 engages poka yoke feature 817 of collar sleeve 815 of housing 810. Engagement of poka yoke features 817 and 827 may facilitate engagement of inflator collar 825 within collar sleeve 815 of housing 810 in a preconfigured rotational position. Poka yoke features 817 and 827 may comprise, for example, matching projections/recessions, matching flattened surfaces, matching rounded surfaces that differ from a radius of curvature of the inflator collar, and the like. The poka yoke features disclosed herein may be used for error proofing for installation and/or may be used for desired component orientation.

As also depicted in FIG. 9, collar sleeve 815 has been coupled with collar 825 by crimping collar sleeve 815 to collar 825. More particularly, collar sleeve 815 comprises a crimp 819 formed on an external surface of collar sleeve 815 that engages crimp groove 826 (not visible in FIG. 9) formed in an external surface of collar 825. Depending upon the materials used to form collar 825 and collar sleeve 815, crimp 819 may be pre-formed in collar sleeve 815, or may be formed in collar sleeve 815 after collar 825 has been inserted into collar sleeve 815. Preferably, however, for embodiments in which collar 825 comprises a rigid metal material, crimp groove 826 is pre-formed in collar 825 to facilitate formation of crimp 819 and engagement between crimp 819 and collar 825.

Crimp 819, as well as each of the retainer clips disclosed herein, are examples of engagement structures for fixedly coupling an inflator with a housing by engaging an exterior surface of an inflator collar with the engagement structure. Similarly, crimp groove 826 is an example of a collar engagement structure configured for engaging an engagement structure in order to fixedly couple an inflator collar with a housing.

In the embodiment depicted in FIG. 9, housing 810 comprises an adapter housing configured to facilitate coupling of inflator 825 with an airbag module housing, such as airbag module housing 100 depicted in FIG. 1. However, it is contemplated that, in alternative embodiments, one or more of the features, elements, principles, or components depicted in FIG. 9 may be applied to couple an inflator directly to an airbag module housing comprising an airbag cushion. In other words, housing 810 may alternatively comprise an airbag module housing. However, because housing 810 comprises an adapter housing, housing 810 further comprises a plurality of openings 806 formed in a base or flange 805 of housing 810 to facilitate coupling of housing 810 with an airbag module housing or another component of such a module. Openings 806 may be configured to each receive a fastener 808, such as a clinch stud, therein.

Figure 10:
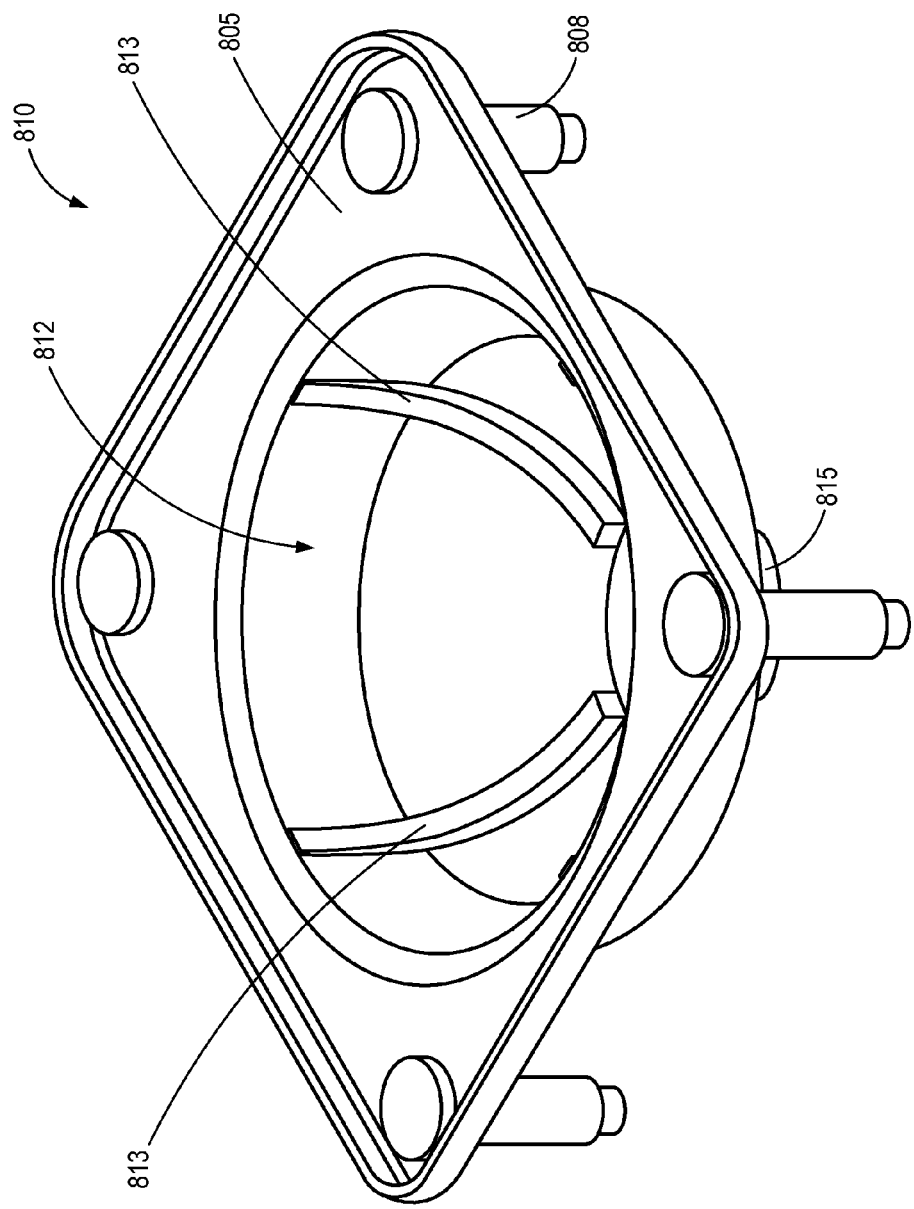
FIG. 10 is a perspective view of the adapter housing of FIG. 9 shown with the inflator removed.

FIG. 10 depicts adapter housing 810 apart from inflator 820. As shown in this figure, housing 810 comprises a recess 812 that may be configured to receive an inflator, such as inflator 820, therein. Recess 812 comprises a hemispherical shape that may at least substantially match a shape of a bottom portion of an inflator. Of course, as mentioned above, other embodiments are contemplated in which the shape of recess 812 and/or the shape of the corresponding inflator may differ as desired.

Figure 11:
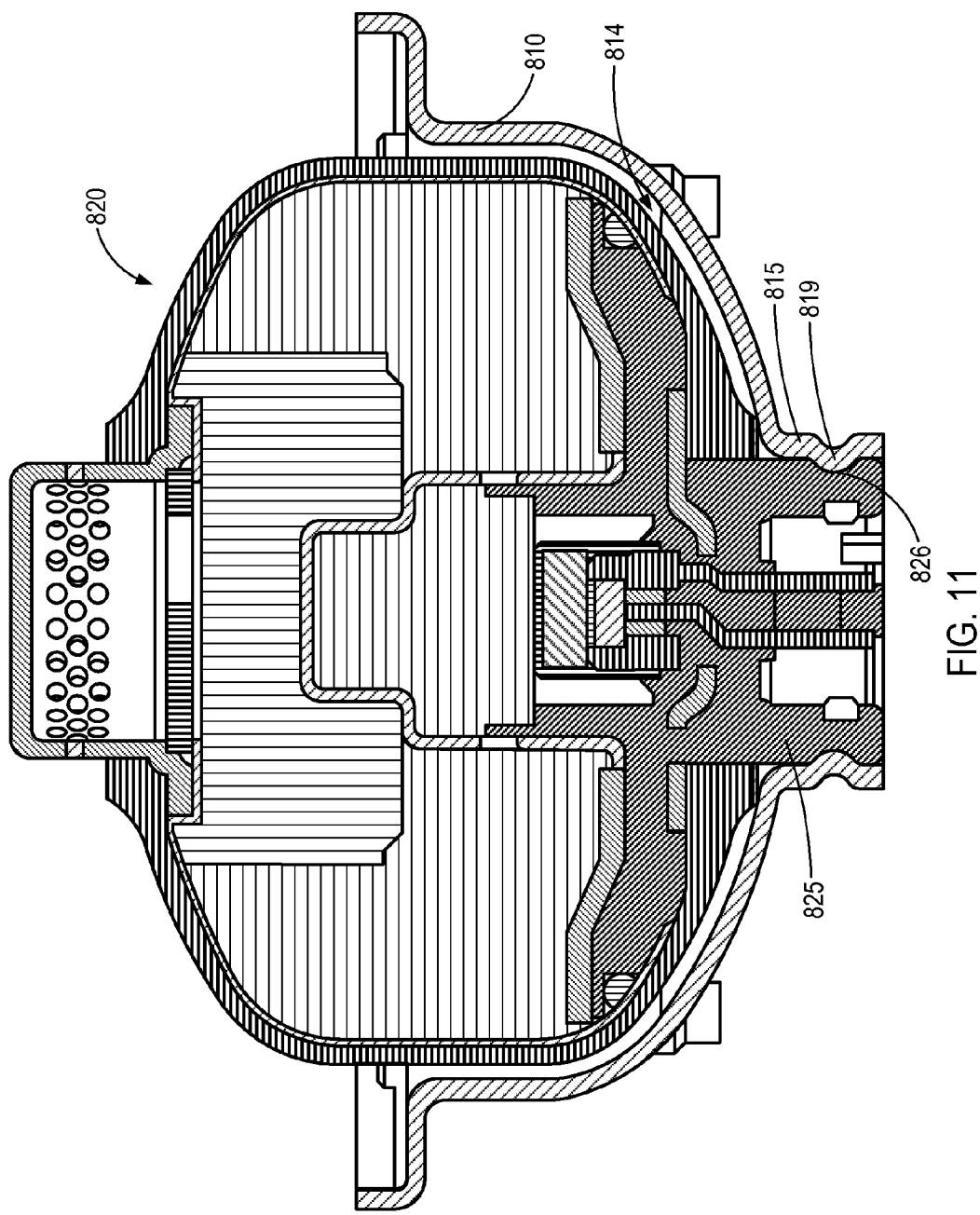
FIG. 11 is a cross-sectional view of the adapter housing and inflator shown in FIG. 9.

Recess 812 further comprises a plurality of ribs 813. Ribs 813 may be used to create one or more air gaps 814, as shown in FIG. 11, in between inflator 820 and housing 810 when inflator 820 has been coupled with housing 810. Air gaps 814 may be useful to facilitate desirable thermal dissipation with respect to heat generating during deployment of inflator 820. In some embodiments, certain heat-dissipating materials, coolants, gels, or other such materials may be inserted within one or more of the air gaps 814. Also, although in the embodiment depicted in FIGS. 10 and 11 the ribs 813 are relatively thin and therefore the majority of the surface area of the interface between the inflator 820 and recess 812 of the housing 810 comprises the air gaps 814, other embodiments are contemplated in which the ribs 813 are wider and therefore may occupy a greater, and in some embodiments a majority, of the surface area of this interface.

Figure 12:
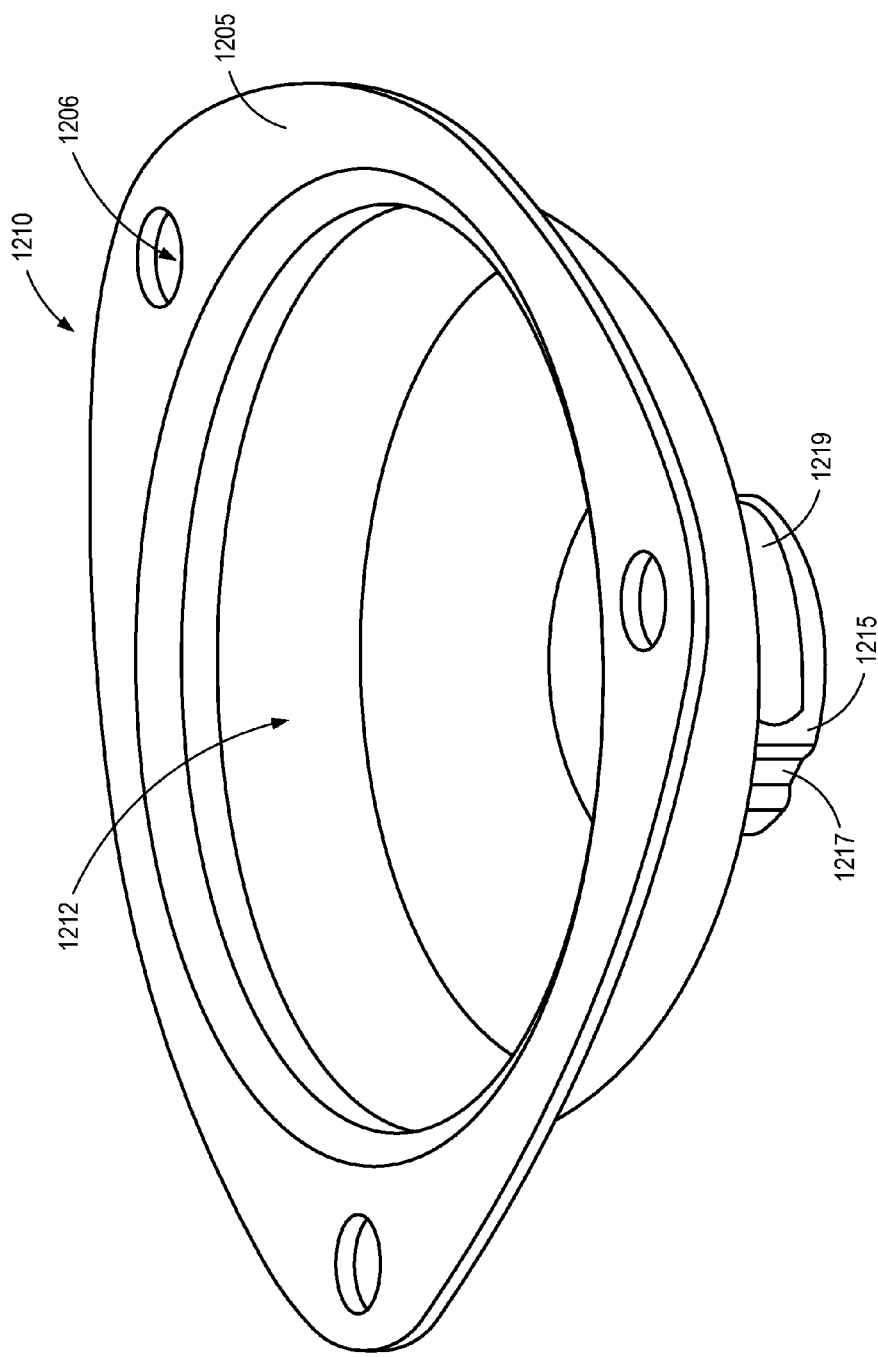
FIG. 12 is a perspective view of an adapter housing configured to facilitate coupling of a flangeless inflator to an airbag module housing according to yet another embodiment.

FIG. 12 depicts an alternative embodiment of an adapter housing 1210 comprising a flange 1205 configured to facilitate coupling of housing 1210 with an airbag module housing or another component of an airbag assembly. Openings 1206 are formed within flange 1205 that are configured to each receive a fastener (not shown in the figure), such as a clinch stud, therein. Unlike adapter housing 810, which comprises a rectangular flange 805 and a fastener opening 806 positioned at each corner of the rectangular flange 805, adapter housing 1210 comprises a triangular flange 1205 comprising a fastener opening 1206 positioned at each of the three corners of flange 1205.

As shown in FIG. 12, housing 1210 further comprises a recess 1212 that may be configured to receive an inflator (not shown in the figure) therein. Recess 1212 may therefore comprise a shape that at least substantially matches with a corresponding shape of a portion of the inflator. Although, unlike housing 810, recess 1212 of housing 1210 lacks ribs for creating one or more air gaps after assembly with an inflator, other embodiments are contemplated in which such ribs may be present.

Housing 1210 also comprises a collar sleeve 1215 comprising a poka yoke feature 1217 comprising a flattened surface that may be used to orient an inflator collar in a preconfigured rotational position within collar sleeve 1215. In addition, collar sleeve 1215 comprises a crimp 1219 formed on an external surface of collar sleeve 1215 that may be coupled with a corresponding crimp groove formed in an external surface of an inflator collar, as described above. As also mentioned above, crimp 1219 may be pre-formed in collar sleeve 1215, as depicted in FIG. 12, or, alternatively, may be formed in collar sleeve 1215 during assembly after an inflator collar has been inserted into collar sleeve 1215.

In an example of a method for assembling a vehicle airbag assembly according to some implementations, a housing may be provided comprising an opening. In some implementations, the housing may comprise an airbag module housing. Alternatively, the housing may comprise an adapter housing configured to facilitate coupling of a flangeless inflator to an airbag module housing.

An inflator comprising a collar may be provided. The collar may be positioned into the opening of the housing such that at least a portion of the exterior surface of the collar is adjacent to a portion of the housing defining the opening. The inflator may then be fixedly coupled to the housing by engaging an exterior surface of the collar with at least one engagement structure, such as a retainer clip or a crimp formed in a collar sleeve of the housing. In implementations in which the engagement structure comprises a retainer clip, the step of fixedly coupling the inflator with the housing may comprise engaging the retainer clip with the collar to prevent the collar from being withdrawn from the opening in the housing. In some preferred implementations, the inflator may then be fixedly coupled to the housing without rotating the inflator and/or inflator collar with respect to the housing.

In some implementations, the collar may comprise at least one collar engagement structure, such as a crimp groove. In some such implementations, the step of fixedly coupling the inflator with the housing may comprise engaging the at least one collar engagement structure with the at least one engagement structure. In some implementations, the opening of the housing may be at least partially defined by a collar sleeve configured to receive the collar of the inflator. In some such implementations, the step of fixedly coupling the inflator with the housing may comprise forming a crimp in the collar sleeve to engage the collar.

Figure 13:
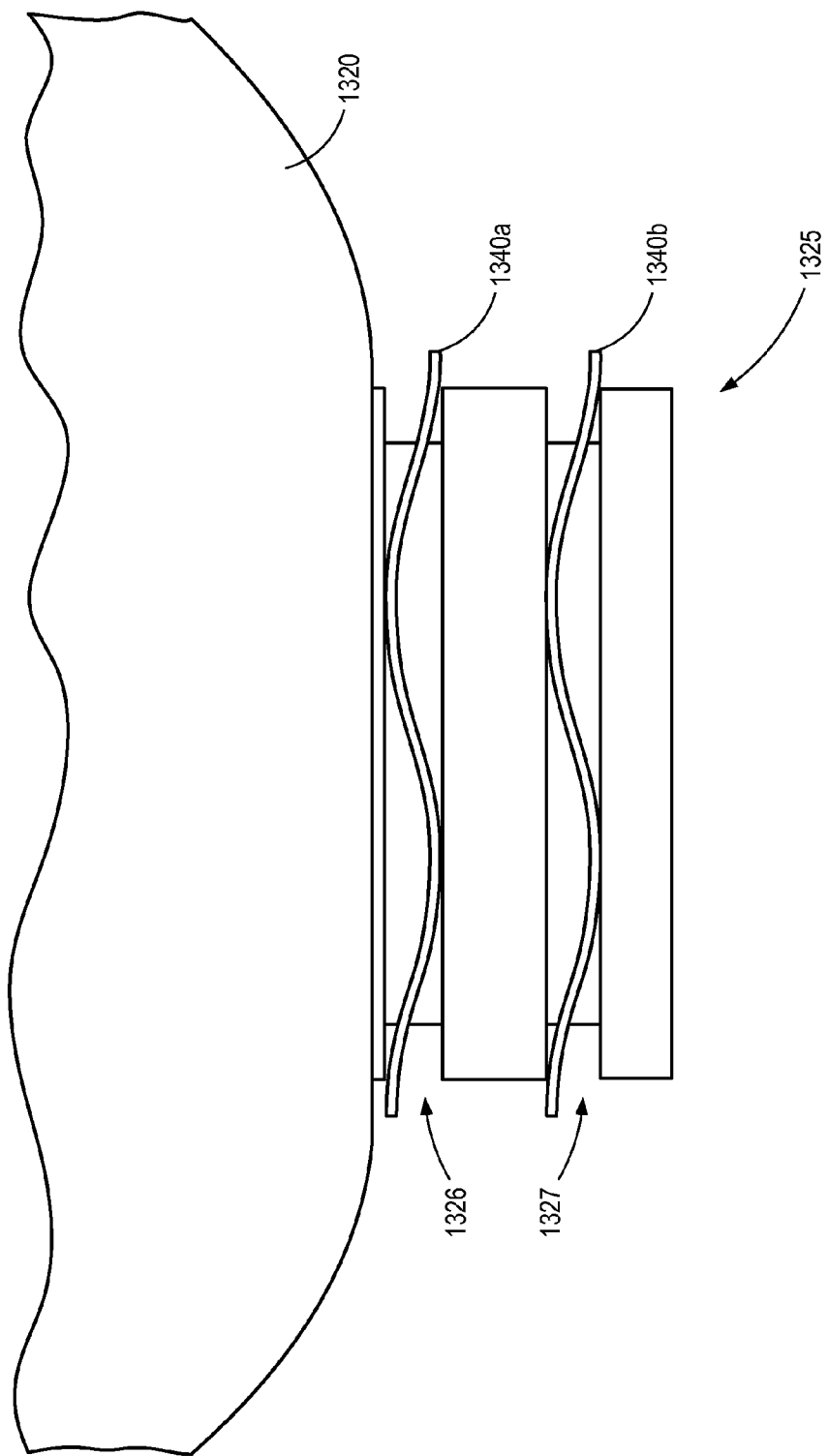
FIG. 13 illustrates another embodiment of an airbag assembly comprising a collar comprising two grooves and two locking rings.

FIG. 13 illustrates another embodiment of an airbag assembly comprising a collar and two locking rings. This figure depicts inflator 1320 comprising an inflator collar 1325 having a first collar slot or groove 1326 and a second collar slot 1327. Collar slots 1326 and 1327 are configured to receive engagement structures 1340a and 1340b, respectively. Engagement structures 1340a and 1340b both comprise locking rings.

Locking rings 1340a and 1340b comprise waved or curved locking rings. Waved retaining rings may be preferable for certain applications since they may provide shock absorption to an airbag module. Thus, the size of the slot(s) within which the locking ring(s) sit may be larger than a compressed size of the locking ring(s), and may be adjusted based upon desired dampening characteristics. However, alternative embodiments are contemplated in which one or both of the locking rings comprise flat rings. Similarly, although collar 1325 is depicted with two slots, alternative embodiments may comprise only a single slot and, thus, only a single locking ring.

In some embodiments, metal or plastic housings may be used to seat the locking ring(s). The size of the slots on the inflator collar may also be enlarged for larger load carrying capacity. Similarly, one or more dimensions of the locking ring(s) (flat or waved) may be adjusted to distribute the load over a desired area of the housing.

In some embodiments, the ring(s) may define a closed ring. Alternatively, the ring(s) may comprise a split ring(s). In some embodiments, the ring(s) may have multiple layers, which may add to shock-absorbing functionality. In some embodiments, the ring(s) may also be made tamper proof.

In some embodiments, the ring(s) may comprise an orientation feature, such as poka yoke feature 827 of collar 825, which may be used to facilitate coupling of the inflator to a housing at a desired orientation. Such rings may, for example, be configured to lock into a keyway in the slot in the inflator collar. In some embodiments, a similar or identical keyway may also, or alternatively, be formed in the housing to allow for locking/selected orientation of the collar, ring, and/or inflator with respect to the housing as well.

Locking rings 1340a and 1340b may be configured to engage opposite sides and/or surfaces of a housing, such as an airbag module housing to facilitate fixedly coupling inflator 1320 with the housing. More particularly, locking rings 1340a and 1340b both extend beyond the perimeter of the portions of collar 1325 that are adjacent to slots 1326 and 1327, thereby allowing for engagement between, for example, two opposing sides of an opening of a housing, or two separate structures positioned adjacent to collar 1325.

In some embodiments, and some implementations of manufacturing methods, the inflator may be manufactured with the first ring (flat or waved) in place at the time of inflator assembly or as a post inflator assembly operation. In some such embodiments and implementations, the first ring may be pre-installed prior to assembly of a module housing with the inflator.

For example, in some embodiments and implementations, locking ring 1340a may be positioned within slot 1326 at the time of assembly of inflator 1320. As a post operation, the ring(s) may be added at e-check or quality inspection. The ring(s) may be reserved during such processes such that the ring(s) is only installed if the inflator passes quality inspection.

In some embodiments, the first ring may function as a cushion location ring. In other words, the first ring may be shaped such that it mates with or otherwise receives the airbag cushion in a particular manner, such as by providing a mating feature on the cushion, to locate the cushion to a specific depth. For example, ring 1340a may, in some embodiments, be configured to be larger and/or have other features and/or components to allow for such functionality.

In some embodiments, and some implementations of manufacturing methods, a second ring, such as ring 1340b, may be coupled with a collar, such as inflator collar 1325, following a step of coupling an inflator and/or collar with a housing. For example, in some embodiments and implementations, inflator collar 1325 may be inserted into an opening in an airbag module housing such that ring 1340a abuts a portion of the airbag module housing adjacent to the opening, after which a second locking ring, such as locking ring 1340b, may be inserted in slot 1327 to prevent inflator collar 1325 from exiting the housing opening.

In some embodiments and implementations, the locking ring(s) may be the only fastener(s) used to couple the inflator with a housing, which may allow for reducing weight, cost and LMPU. Providing locking ring(s) with sufficient size and/or strength may also allow for distribution of a load over a larger area of the housing, which may allow for elimination of the need for additional load-bearing washer and metal brackets.

Figures 14A, 14B:
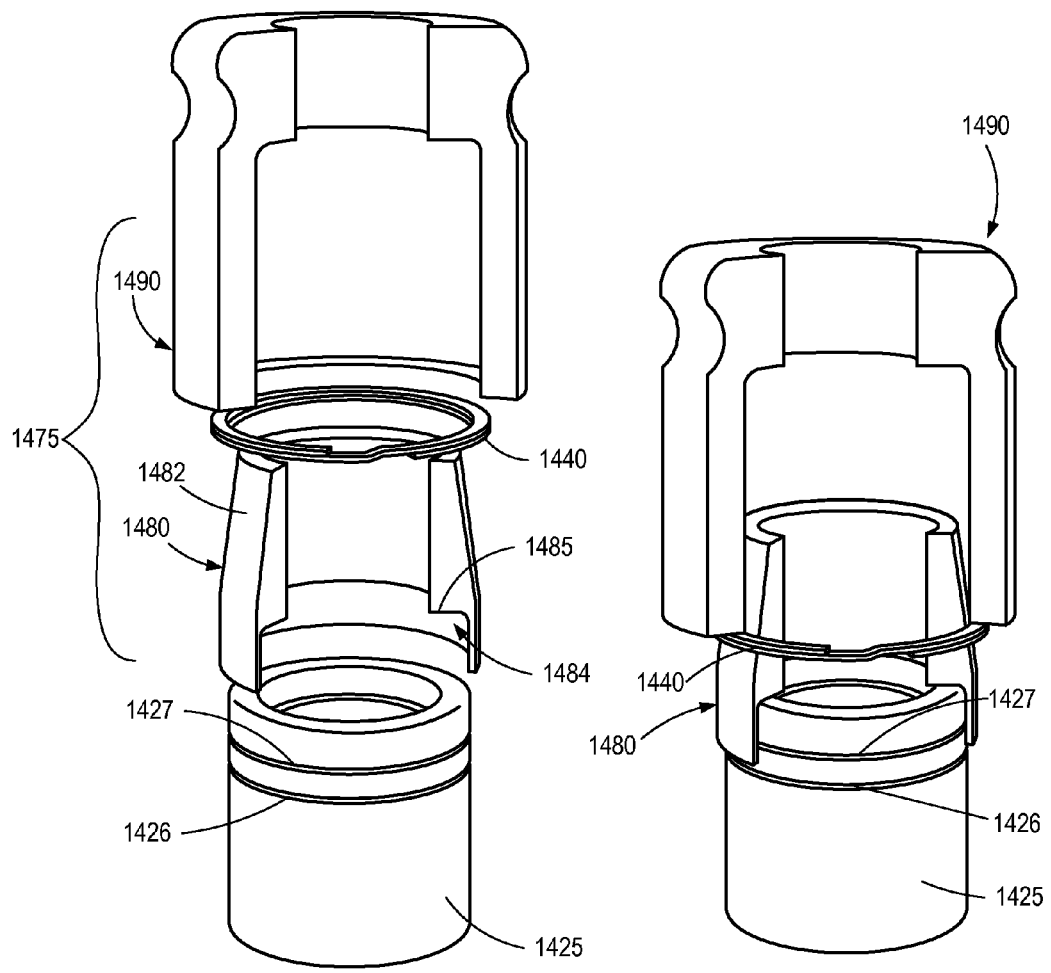
FIGS. 14A-14D illustrate a tool for coupling locking rings with a slotted collar and various steps used during a process for using such a tool.

FIGS. 14A-14D illustrate a tool for coupling one or more locking rings with a slotted collar and various steps used during a process for using such a tool. More particularly, FIG. 14A depicts a tool 1475 comprising two parts, namely, an inner sleeve 1480 configured to be partially received in an outer sleeve 1490. Inner sleeve 1480 comprises an outer surface 1482 that tapers to allow for receipt of a locking ring 1440 over the top of inner sleeve but, due to the tapering, prevents locking ring 1440 from passing all of the way over inner sleeve 1480 without being flexed and/or deformed, as depicted in FIG. 14B.

Figure 14C:
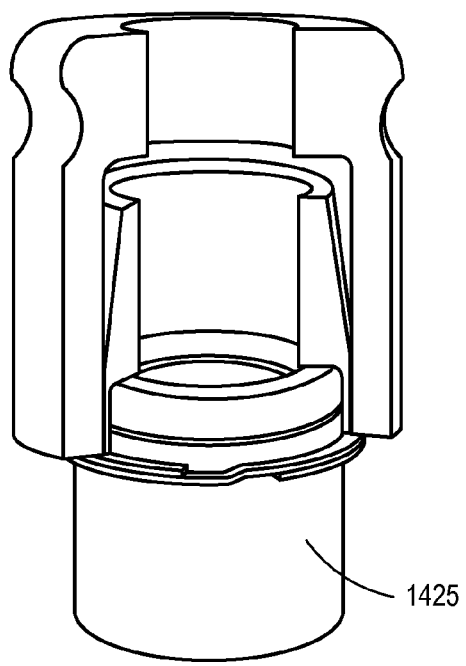

Inner sleeve 1480 further comprises a recessed area 1484 defined in part by a ledge 1485. Ledge 1485 allows inner sleeve 1480 to rest on collar 1425 such that the exterior surface of inner sleeve 1480 blocks one but not both of the locking ring slots. More particularly, as shown in FIG. 14B, when fully positioned on the end of collar 1425, inner sleeve 1480 covers slot 1427 but not slot 1426. As such, outer sleeve 1490 may be used to press locking ring 1440 down over the exterior surface of inner sleeve 1480 and into locking ring slot 1426, as depicted in FIG. 14C. Thus, preferably outer sleeve 1490 has an inner diameter that is approximately equal to, or slightly greater than, the exterior diameter of inner sleeve 1480.

Figure 14D:
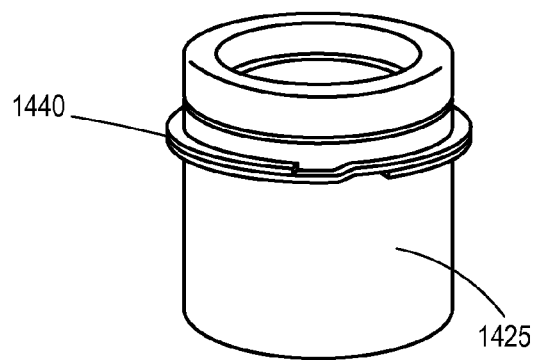

Once the locking ring 1440 has been positioned with the distal slot 1426, the outer sleeve 1490 and the inner sleeve 1480 may be removed from collar 1425, as depicted in FIG. 14D. Collar 1425 may then be coupled with a housing by inserting collar 1425 into a housing opening, as previously described, after which a second installation tool similar to tool 1475 may be used, if desired, to insert a second locking ring within slot 1427 to lock collar 1425 within such opening. In some embodiments, the dimensions of the second installation tool (not shown) may differ so as to facilitate such coupling. For example, the depth of the recessed area of such tool may be less than the depth of recessed area 1484 of tool 1475 such that it does not cover slot 1427.

Figure 15:
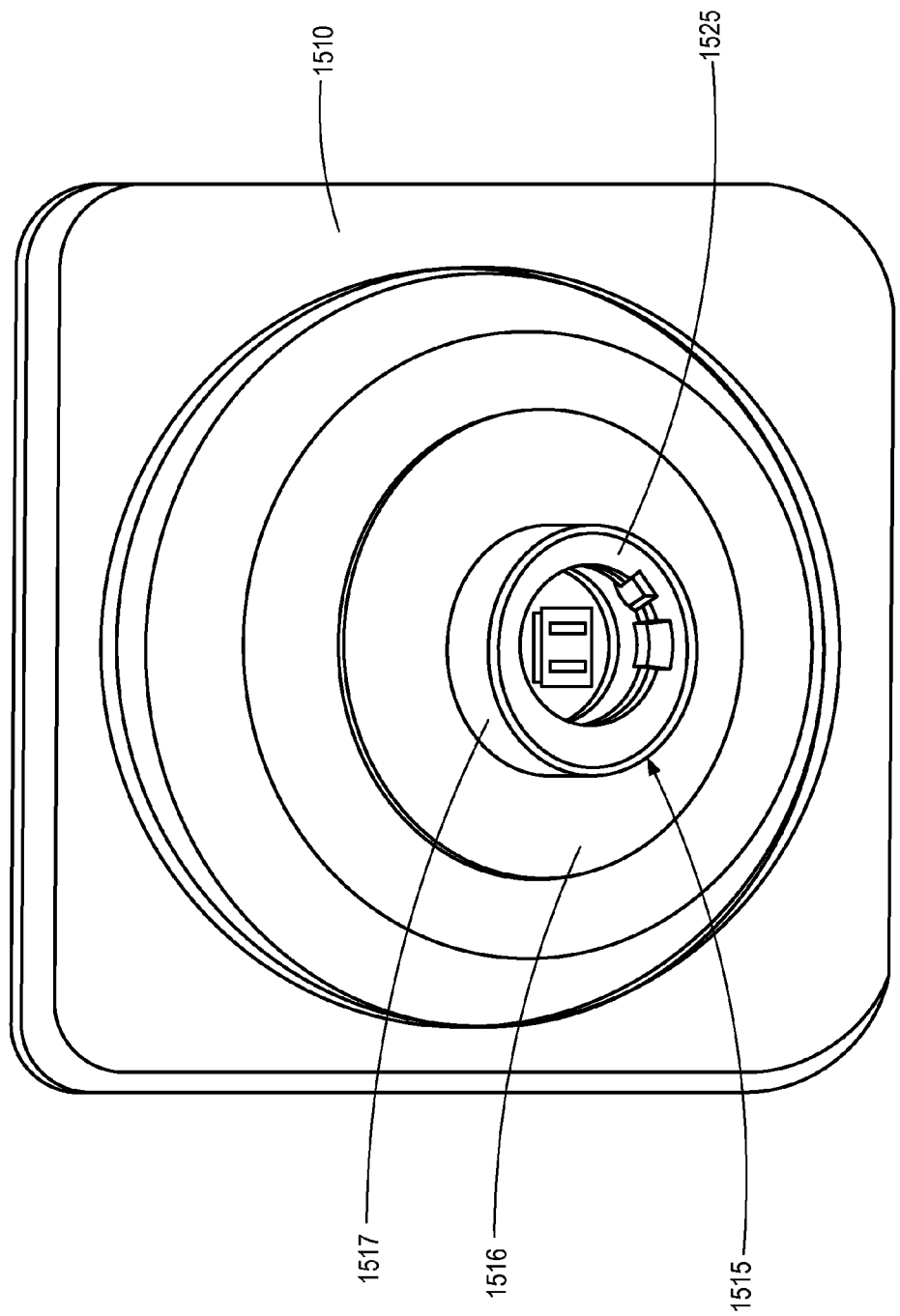
FIG. 15 depicts yet another embodiment of an airbag assembly comprising a cap configured to facilitate engagement between an inflator collar and an airbag module housing.

FIG. 15 depicts yet another embodiment of an airbag assembly comprising a crimp cap 1515 configured to facilitate engagement between an inflator collar 1525 and an airbag module housing 1510. Crimp cap 1515 should be considered another example of an engagement structure fixedly coupling an inflator with a housing.

Inflator collar 1525 is configured to be received in an opening of a housing—such as an airbag module housing or an adapter housing configured to facilitate coupling of a flangeless inflator to an airbag module housing. For example, in some embodiments, collar 1525 may be configured to extend into a collar sleeve of a housing, as previously discussed. Collar 1525 may, in some embodiments, further comprise a crimping feature, such as a groove, configured to facilitate fixed engagement between the collar 1525 and crimp cap 1515. Similarly, in some embodiments, crimp cap 1515 may comprise a similar protrusion or other crimping feature configured to further facilitate such crimping.

Figure 16:
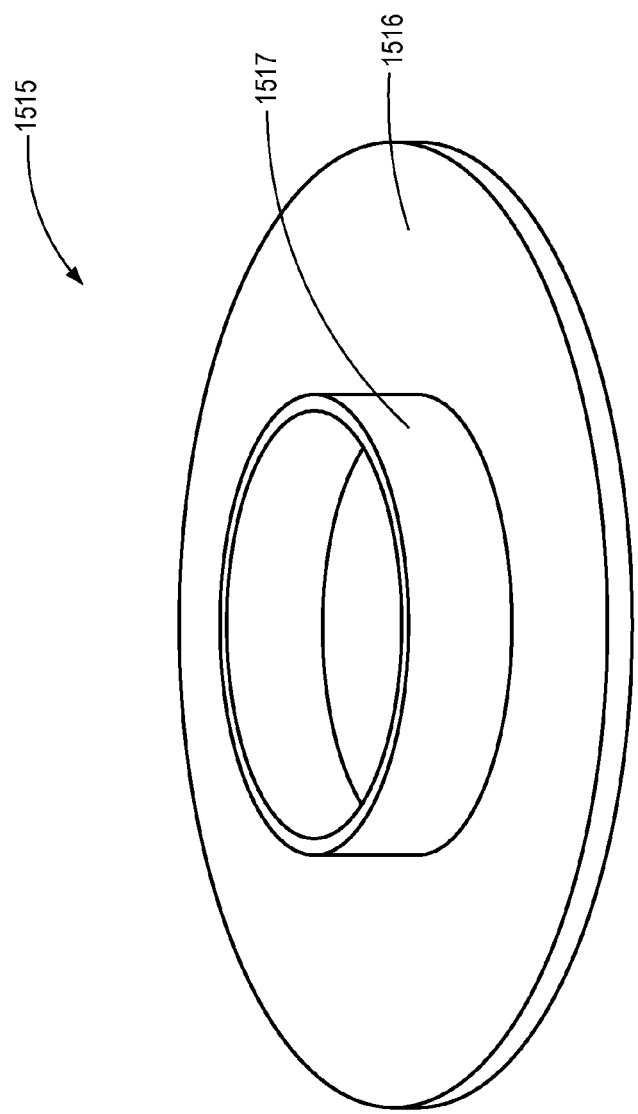
FIG. 16 is a perspective view of the cap of FIG. 15.

FIG. 16 is a perspective view of crimp cap 1515. Crimp cap 1515 may comprise a collar 1517 that may be configured to fit over collar 1525 and may further comprise a plate or flange 1516 configured to abut a portion of a housing, such as housing 1510, in order to secure collar 1517 in place relative to housing 1510. Flange 1516 may be used to distribute the inflator and/or cushion loads across the housing. In some embodiments, plate/flange 1516 may be flat. Alternatively, plate/flange 1516 may comprise a curved surface that may be configured to mate with a corresponding curved surface of a housing.

In some embodiments, collar 1525, like collar 825 for example, may further comprises a poka yoke feature similar to poka yoke feature 827. In some embodiments, once crimp cap collar 1517 has been positioned over inflator collar 1525, a crimping may be applied to rigidly affix collar 1517 to collar 1525. As previously mentioned, in some embodiments, collar 1525 may comprise a groove configured to facilitate such crimping.

Crimp cap 1515 may be made up of steel and may, in some embodiments, be rounded on the end to go around an inflator initiator and form an open cup. In some embodiments, crimp cap 1515 may be used in conjunction with one or more of the other inventive concepts disclosed herein and/or other known concepts/components. For example, in some embodiments, crimp cap 1515 may be used with a retainer clip, such as retainer clip 140. In some embodiments, crimp cap 1515 may be used with a bayonette-style adapter on an initiator, may be used with a flange-style adapter on an initiator, and/or may be crimped such that the airbag cushion and inflator are pulled tightly in contact with the housing to reduce BSR and NVH.

Metal may be added to crimp cap 1515 to allow for Module Damping when needed. Crimp cap 1515 may also be formed in a metal housing when the housing is stamped. In some embodiments, stiffening ribs may be added to a recess area defined by plate/flange 1516, similar to ribs 813. The crimp cap 1515 may be molded into a housing to reduce the additional component at the module level if desired. The crimp cap 1515 may be crimped into a mating metal part on the inflator's initiator end designed to provide strength and tightening of the inflator to the housing.

In some embodiments, one or more additional locking features may be added to the housing and/or flange if needed. For example, as mentioned above, additional crimps may be added and/or other locking components, such a locking rings and/or retainer clips, may be used to further solidify the engagement between the crimp cap and the housing.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A method for assembling a vehicle airbag assembly, the method comprising the steps of:
   providing a housing comprising an opening;
   providing an inflator comprising a collar, wherein the collar comprises an exterior surface;
   positioning the collar of the inflator into the opening of the housing such that at least a portion of the exterior surface of the collar is adjacent to a portion of the housing defining the opening; and
   coupling the inflator with the housing by engaging the exterior surface of the collar with at least one engagement structure such that the engagement structure directly engages the collar and such that the engagement structure directly engages the housing to secure the inflator to the housing.

2. The method of claim 1, wherein the housing comprises an airbag module housing.

3. The method of claim 1, wherein the collar comprises a groove, wherein the engagement structure comprises a locking ring, and wherein the step of coupling the inflator with the housing comprises positioning the locking ring in the groove.

4. The method of claim 3, wherein the collar further comprises a second groove, and wherein the step of coupling the inflator with the housing further comprises positioning a second locking ring in the second groove such that a portion of the housing is sandwiched between the locking ring and the second locking ring.

5. The method of claim 1, wherein the housing comprises an adapter housing configured to facilitate coupling of a flangeless inflator to an airbag module housing.

6. The method of claim 1, wherein the collar comprises at least one collar engagement structure, and wherein the step of coupling the inflator with the housing comprises engaging the at least one collar engagement structure with the at least one engagement structure.

7. The method of claim 6, wherein the opening of the housing is at least partially defined by a collar sleeve configured to receive the collar of the inflator, and wherein the step of coupling the inflator with the housing comprises forming a crimp in the collar sleeve to engage the collar.

8. The method of claim 7, wherein the collar comprises a crimp groove configured to receive the crimp formed in the collar sleeve, and wherein the step of coupling the inflator with the housing comprises forming a crimp in the collar sleeve that engages the crimp groove.

9. The method of claim 1, wherein the inflator comprises an initiator, and wherein the initiator is at least partially housed within the collar.

10. The method of claim 1, wherein the at least one engagement structure comprises a retainer clip, and wherein the step of coupling the inflator with the housing comprises engaging the retainer clip with the collar to prevent the collar from being withdrawn from the opening.

11. The method of claim 1, wherein the step of coupling the inflator with the housing comprises coupling the inflator with the housing without rotating the inflator with respect to the housing.

12. The method of claim 1, wherein the engagement structure comprises a crimp cap comprising a crimp cap collar and a crimp cap flange, and wherein the step of coupling the inflator with the housing comprises:
   inserting the collar of the inflator into the crimp cap collar such that the crimp cap flange is positioned against the housing; and
   crimping the crimp cap collar to the collar of the inflator to couple the inflator with the housing.

13. A vehicle airbag assembly, comprising:
   an airbag module housing comprising an opening, wherein the airbag module housing comprises an interior surface and an exterior surface opposite from the interior surface;
   an airbag cushion positioned within the interior surface of the airbag module housing;
   an inflator comprising a collar configured to be received in the opening, wherein the collar is configured to extend at least partially through the opening such that at least a portion of the collar extends out of the opening and is positioned adjacent to the exterior surface of the airbag module housing; and
   a retainer clip configured to engage the at least a portion of the collar extending out of the opening to prevent the collar from being withdrawn from the opening after the collar has been positioned such that at least a portion of the collar extends out of the opening, and such that the retainer clip engages the exterior surface of the airbag module housing.

14. The vehicle airbag assembly of claim 13, wherein the inflator comprises an initiator, and wherein the initiator is at least partially housed within the collar.

15. The vehicle airbag assembly of claim 13, wherein the retainer clip comprises at least two legs, and wherein the collar comprises at least one slot configured to receive at least a portion of at least one of the legs.

16. The vehicle airbag assembly of claim 15, wherein the collar comprises two opposing slots configured to receive two opposing legs of the retainer clip to prevent the collar from being withdrawn from the opening.

17. The vehicle airbag assembly of claim 13, wherein the retainer clip is configured to resiliently bias the collar with respect to the airbag module housing to prevent the collar from being withdrawn from the opening.

18. The vehicle airbag assembly of claim 17, wherein the retainer clip comprises an offset portion configured to contact a portion of the airbag module housing adjacent to the opening when the retainer clip is engaged with the collar such that at least a portion of the retainer clip adjacent to the offset portion is spaced apart from a portion of the airbag module housing adjacent to the opening when the retainer clip is engaged with the collar.

19. The vehicle airbag assembly of claim 13, wherein the collar comprises a projection, and wherein the opening of the airbag module housing comprises a notch configured to receive the projection to align the collar within the opening in a preconfigured rotational position.

20. The vehicle airbag assembly of claim 13, wherein the inflator comprises a composite fiber overwrap.

21. The vehicle airbag assembly of claim 13, wherein the retainer clip is configured to engage the collar along a first portion of the retainer clip and to engage the housing along a second portion of the retainer clip.

22. A vehicle airbag assembly, comprising:
a housing comprising an opening at least partially defined by a collar sleeve, wherein the housing comprises an interior surface and an exterior surface opposite from the interior surface;
an airbag cushion coupled with the housing and positioned adjacent to the interior surface of the housing; and
an inflator comprising an inflator collar configured to be received in the opening and to extend into the collar sleeve, wherein the inflator collar comprises at least one crimping feature configured to facilitate fixed engagement between the inflator collar and the collar sleeve, and wherein the collar sleeve is directly coupled to the inflator collar at the at least one crimping feature without the airbag cushion being positioned between the collar sleeve and the inflator collar.

23. The vehicle airbag assembly of claim 22, further comprising an airbag module housing, wherein the inflator comprises a flangeless inflator, and wherein the housing comprises an adapter housing configured to facilitate coupling of the flangeless inflator to the airbag module housing.

24. The vehicle airbag assembly of claim 22, wherein the inflator comprises a composite fiber overwrap.

25. The vehicle airbag assembly of claim 22, wherein the collar sleeve comprises a poka yoke feature, and wherein the inflator collar comprises a corresponding poka yoke feature configured to facilitate engagement of the inflator collar within the collar sleeve in a preconfigured rotational position.

26. The vehicle airbag assembly of claim 22, wherein the at least one crimping feature comprises a crimp groove configured to engage a crimp formed in the collar sleeve.

27. The vehicle airbag assembly of claim 22, wherein the housing is configured such that, upon engagement of the inflator with the housing, at least one air gap is formed between the inflator and the housing.

28. The vehicle airbag assembly of claim 27, wherein the housing comprises a plurality of ribs formed within an inner surface of the housing configured to contact the inflator such that a plurality of air gaps are formed between the inflator and the housing in between the ribs.

29. The vehicle airbag assembly of claim 22, wherein the at least one crimping feature is configured to facilitate fixed engagement between the inflator collar and the collar sleeve without requiring any additional locking components or elements to accomplish the fixed engagement.

* * * * *